United States Patent

[19]

Lee

[11] Patent Number: 5,844,472
[45] Date of Patent: Dec. 1, 1998

[54] PORTABLE RECHARGEABLE POWER SUPPLY ADAPTOR WITH ILLUMINATED KEY HOLDER

[76] Inventor: Victor Shiu P. Lee, 6018 Crestmont Dr., Chino Hills, Calif. 91709

[21] Appl. No.: 898,843

[22] Filed: Jul. 25, 1997

[51] Int. Cl.⁶ .................................................. B60Q 1/00
[52] U.S. Cl. ...................... 340/438; 340/473; 340/321; 340/693; 320/111; 362/439
[58] Field of Search ................... 340/473, 438, 340/691, 693, 692, 321, 636; 320/107, 111, 114, 115, 138, 132; 362/439, 430, 182; 439/622; 248/447.2

[56] References Cited

U.S. PATENT DOCUMENTS

| | | | |
|---|---|---|---|
| D. 236,652 | 9/1975 | Zalman | 48/24 |
| D. 262,241 | 12/1981 | Meo | 3/63 |
| D. 263,651 | 4/1982 | Meo | 3/63 |
| D. 283,684 | 5/1986 | Francis | 10/104 |
| D. 288,468 | 2/1987 | Ruttinger | 22/117 |
| D. 292,243 | 10/1987 | O'Grady | 3/63 |
| D. 311,349 | 10/1990 | Walsh | 10/106 |
| D. 313,504 | 1/1991 | Charet | 3/63 |
| D. 370,339 | 6/1996 | Pinchuk | 3/208 |
| 3,109,132 | 10/1963 | Witte | 320/114 |
| 3,931,865 | 1/1976 | Levitt | 340/573 |
| 4,163,186 | 7/1979 | Haley | 340/363 |
| 4,842,235 | 6/1989 | Brown et al. | 248/447.2 |
| 4,897,768 | 1/1990 | Thul | 362/191 |
| 4,972,172 | 11/1990 | McLaughlin | 340/331 |
| 5,008,784 | 4/1991 | Wang | 362/116 |
| 5,309,336 | 5/1994 | Hartt et al. | 362/183 |
| 5,442,529 | 8/1995 | Hoover | 362/119 |
| 5,475,368 | 12/1995 | Collins | 340/573 |
| 5,578,992 | 11/1996 | Harding | 340/574 |
| 5,604,479 | 2/1997 | Chang | 340/384.7 |
| 5,684,378 | 11/1997 | Furth et al. | 320/111 |

*Primary Examiner*—Jeffery A. Hofsass
*Assistant Examiner*—Anh La
*Attorney, Agent, or Firm*—Stephan D. Carver

[57] ABSTRACT

A portable, electronic device provides base functions as an illuminated key holder, a recharging system, and an accessory light, as well as extended functions. The internal Nicad battery power supply can be recharged from a variety of sources. With the device plugged into a recharging source such as a cigarette lighter socket, a special docking mechanism interfaces with it to power or recharge a variety of electronic devices. The docking unit provides a universal adaptor to mate with several different popular socket sizes. In the best mode an audio recorder and playback device is combined with the flashlight and key chain apparatus. This enables both voice recording and playback. A map light mounting system enables the module to be held in a desired position within a vehicle to provide a mounted light source once the key ring is removed. The map light uses a resilient stand having a pair of slotted wings that are coupled to specially configured clips that easily adapt to surfaces and projections that might be encountered within an automobile such as air conditioning louvers or the like. The clips have special hooks that are slidably captivated within the wing slots. Zig-zag clip legs are resiliently biased together to readily affix the clips to an object. The docking system normally provides a regulated direct current output that is voltage selectable to supply voltages used by common electronic devices. A bypass switch within the module bypasses the module voltage regulator for docking.

28 Claims, 9 Drawing Sheets

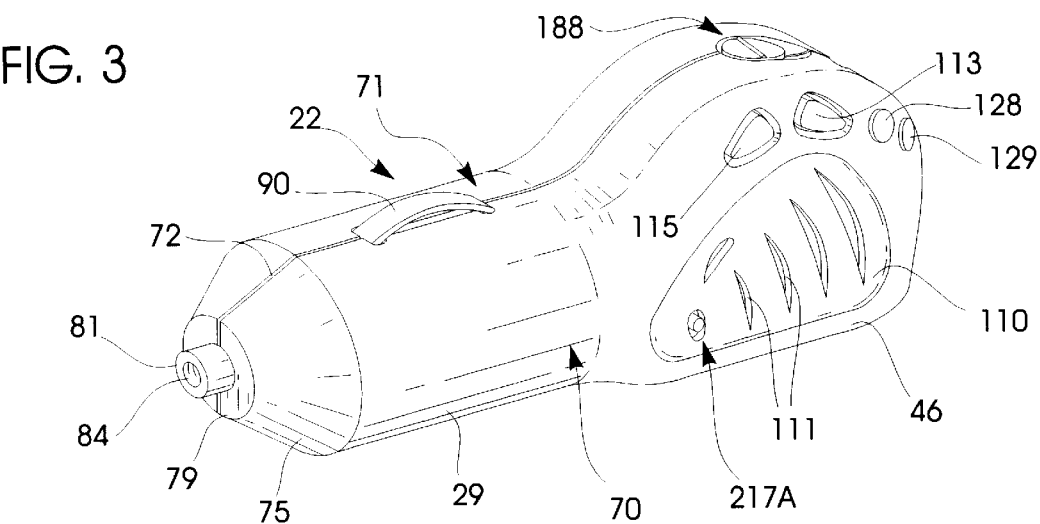
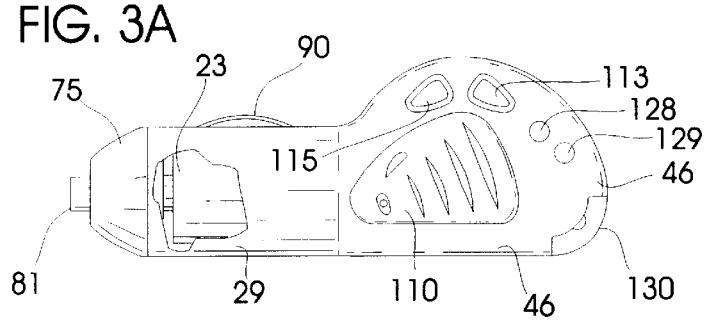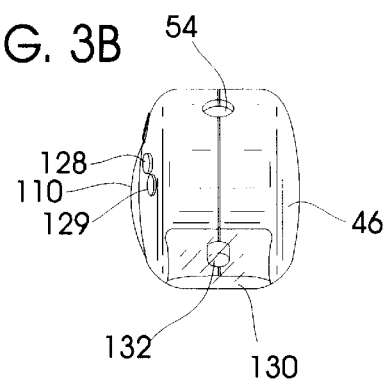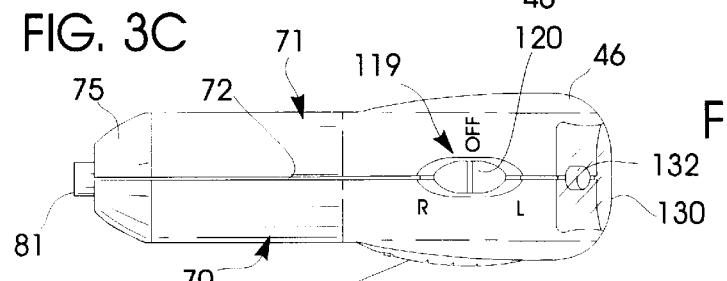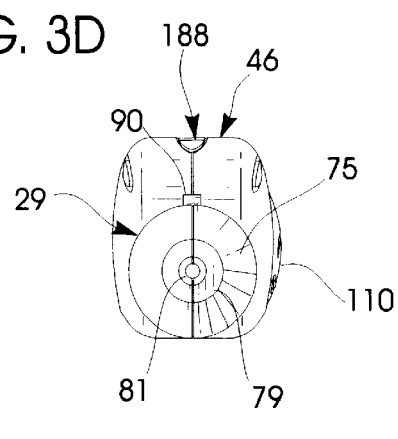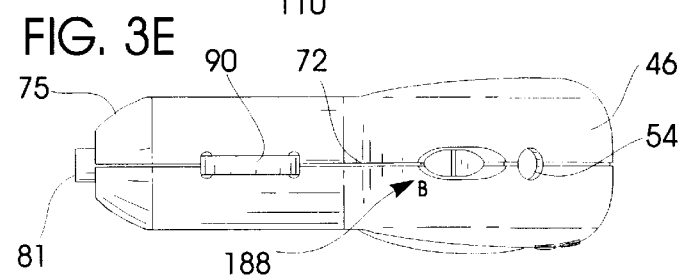

PORTABLE RECHARGEABLE POWER SUPPLY ADAPTOR WITH ILLUMINATED KEY HOLDER

BACKGROUND OF THE INVENTION

I. Field of the Invention

The present invention relates generally to portable, battery powered multi-function electronic devices that require recharging, including rechargeable power supplies, lights, key holders, accessory interfaces or the like. More particularly, my invention relates to a multi-functional, solid state electronic key holder device that can be recharged from a variety of sources, and which readily powers or recharges a variety of accessories or other electronic devices.

II. Description of the Prior Art

In the prior art a wide variety of electronic self-contained and portable internally powered devices and accessories are known. A number of prior art devices comprising internal power supplies and lights have been combined with key holders or key rings. Some prior art key rings include knives or other contrivances in addition to battery operated lights or flash lights. Usually internal batteries supply the necessary power. For example, U.S. Pat. No. 5,008,784 issued Apr. 16, 1991 shows a tubular key ring device in the form of a small flashlight that enables a user to illuminate a lock before inserting keys.

The same concept is shown in U.S. Design Pat. No. 236,652.

U.S. Design Pat. No. 370,339 discloses a design for a self-contained key container combined with an electronic sound recorder and playback machine.

U.S. Design Pat. No. 311,349 discloses a combined personal alarm and key ring. The generally cubical housing is attached to a key ring at its corner and presumably houses suitable circuitry to generate a loud noise when triggered.

U.S. Design Pat. No. 288,468 shows a flash light combined with a protective spray holder and a key chain.

U.S. Design Pat. Nos. 263,651; Des. 262,241 and 283,684 show various structures that combine lights with key chains. Both of the latter patents disclose devices having self-contained power supplies.

U.S. Design Pat. Nos. 313,504 and 292,243 show battery operated lights combined with removable key holders.

U.S. Pat. No. 5,578,992 shows a digital electronic safety alarm combined with a flashlight and a self contained power source. The light source and the audio unit are controlled by internal circuitry.

U.S. Pat. No. 5,442,529 shows a knife combined with key rings, a light and a power source. An internal battery operates a small bulb in the back of the knife.

Many battery-powered accessories for automobiles and/or home use, including flashlights, cellular phones, portable radios, and the like are in wide spread use. Many of these devices are recharged through suitable apparatus sold with the unit. A variety of adapters and recharging units are known. However, a simple portable device that functions as a recharger for many diverse electronic devices, which can be carried in a pocket and used successfully for a number of electrical or mechanical purposes both in the home and in an a vehicle, would be desirable.

For example, a multi-function, portable device that can be quickly transformed between home and auto uses would minimize the number of recharging cords and accessories that a consumer must otherwise carry to operate diverse devices. It would be highly advantageous to simplify the recharging process. An appropriate device must easily mate with the vehicle cigarette lighter, for example, while at the same time offering diverse power outputs for many different electronic accessories. While portable electronic devices that charge within a vehicle are well known, no prior art references have hitherto disclosed the combination of a portable, rechargeable power supply that can be transformed between roles as a key holder, a map light, a recharger for cellular phones or the like, and an audio recorder-playback unit which is readily transformable between home use and vehicular use. An ideal device must be small, compact and portable. It must require the carrying of a minimal amount of cords and jacks. It must aid in recharging other battery-operated devices such as recorders, players, personal alarms, battery monitors, air ionizers and the like with a minimum of effort and inconvenience.

SUMMARY OF THE INVENTION

The present invention comprises a portable electronic multi-function device capable of a variety of beneficial applications. The invention broadly functions as an illuminated key holder, a portable recharging unit, and an auxiliary or accessory light. A map light arrangement provides a convenient way for the user to mount the apparatus in a convenient fashion within a vehicle. The internal power supply can be recharged from a variety of sources. A docking mechanism interfaces with a hand-held module to recharge a variety of battery powered electronic devices with multiple jacks to adapt to differing configurations.

The module may house an audio alarm, a record playback mechanism, a vehicle battery monitor, or other basic device. Thus device note only has the capability of recharging a variety of popular electronic devices or accessories with its docking system, but it accomplishes several fundamental functions without docking that are useful to the traveling consumer.

At the heart of the preferred device is an internal power circuit. A number of user desired, functions may be selected in variations of the device. For example, the device normally functions as an audio recorder, enabling both voice recording and playback. This function is normally combined with the flashlight, map light and key holder functions also described. Alternatively, it can be configured as a car battery monitor, a personal alarm, a mosquito or dog repeller, or a vehicle battery monitor.

The internal light system functions at the behest of the user in combination with all other possible functions. For example, the "key holder" function of the device is complemented by the lighting circuitry, making it easier to find a key hole in the dark. The key holder apparatus may be easily removed for recharging the device, or for transforming it into a vehicular accessory light. A unique map light mounting system is employed to mount the transformed light system in a desired orientation within a vehicle.

The portable, self contained device may be carried by a user between, for example, an automobile and an office. It may be quickly transformed into a recharge configuration when needed. When used with an automobile, it can be plugged into the 12 volt DC cigarette lighter. This will mechanically mount the device in a convenient fashion, and will recharge the internal power supply when necessary. Further, when the docking mechanism is attached, a variety of other electronic gadgets may be recharged through the universal adaptor on the docking mechanism.

The conveniently shaped module is easily grasped by a user for orientation. The module readily fits in a map light mounting system that is ideal for vehicles. The map light frame is specially designed to be mounted in a variety of orientations. It has a generally vertical body portion supported by slotted wings that are quick mounted via flexible clips. The clips resiliently, slidably mount to the wings and are capable of assuming a wide variety of orientations, thus adapting the map light system for mounting almost anywhere. The mounting system is also compact and portable. It may be conveniently carried by the user between vehicles or locations.

Thus, an object of my invention is to provide a portable rechargeable power supply that performs a diverse number functions.

A basic object is to provide an illuminated key holder device.

Another object is to provide a portable, recharger for cellular phones and similar portable electronic devices.

Another object of my invention is to provide a portable flashlight or map light device which can be recharged from a variety of sources.

Another object of my invention is to provide a simple, portable audio recorder that can record and play back audio.

A still further object of my invention is to provide an automotive battery checker.

Another object of my invention is to provide an alarm which can be used for personal safety.

Yet another object of my invention is to provide a dexterous map light, that can be readily and conveniently disposed in a suitable orientation within an automobile to illuminate a map while driving.

A fundamental object of my invention is to minimize the number of separate recharge items that a consumer might ordinarily need in order to charge or use a variety of electronic gadgets.

A broad object is to provide a portable, self powered rechargeable multi-function device that combines a variety of helpful functions in a neat portable, economical package.

Another object of my invention is to provide a portable key ring device which can be readily detached from the powered module.

A fundamental purpose is to provide a multi-function, electronic device of the character described that may be transformed by the user as desired between the multiple roles discussed above.

Another fundamental object is to combine fundamental devices, including a recorder player device, a car battery monitor and a personal alarm with an internal flashlight, a clip mount map light, a removable key ring, and a DC output jack to power various extended accessories. It is a feature of my invention that unique digital electronic circuitry is provided to accomplish the aforesaid purposes.

A basic purpose is to provide a device of the character described that interfaces with a variety of other electrical and electronic accessories to recharge them. For example, a charger cable and a suitable adaptor enables the device to recharge conventional cellular phone systems.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is an enlarged, frontal isometric view of the preferred device;

FIG. 3A is a fragmentary, left side elevational view thereof;

FIG. 3B is a rear end view thereof;

FIG. 3C is a bottom plan view thereof;

FIG. 3D is a front plan view thereof;

FIG. 3E is a top plan view thereof;

DETAILED DESCRIPTION

Figure 1:
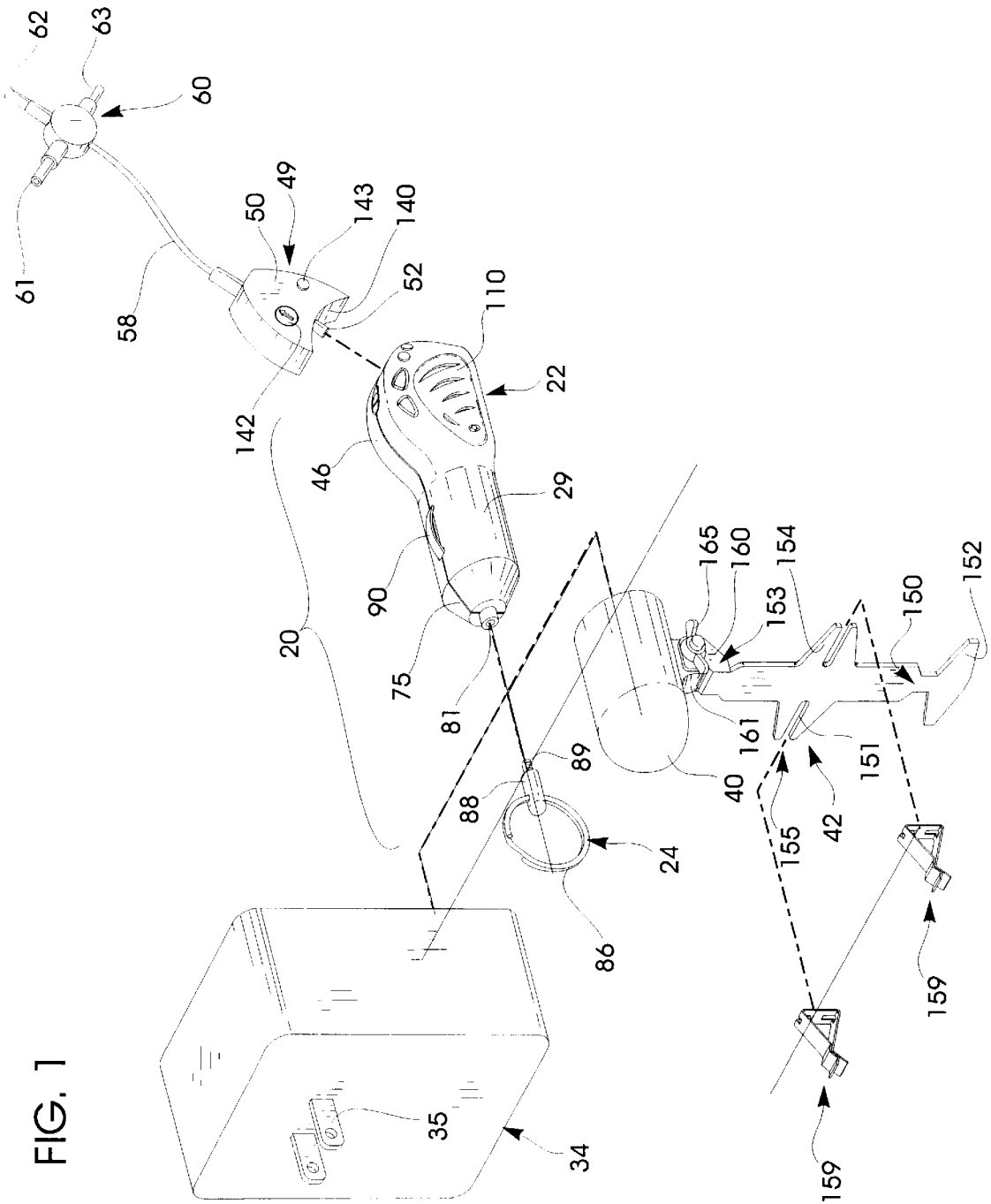
FIG. 1 is an exploded frontal isometric view of the preferred Portable Rechargeable Power Supply Adaptor with Illuminated Key Holder, showing the docking mechanism, the map light holder, and an A.C. recharger.

Referring initially to FIGS. 1–4 of the drawings, my Portable, Rechargeable Illuminated Key Holder has generally been designated with the reference numeral 20. At the heart invention is a unique, hand-held, portable module generally designated by the reference numeral 22. The rechargeable module 22 houses an internal NiCad battery pack shown in the schematic diagram to be discussed hereinafter. Nominally this provides 4.8 volts D.C. output. An individual battery 23 appears in FIG. 3A. Module 22 removably mounts a key ring assembly 24 that is easily attached or detached as desired. With the key ring assembly 24 attached, module 22 functions as a key holder; when the key ring assembly is removed the module is ready for insertion into a recharge outlet.

Figure 4:
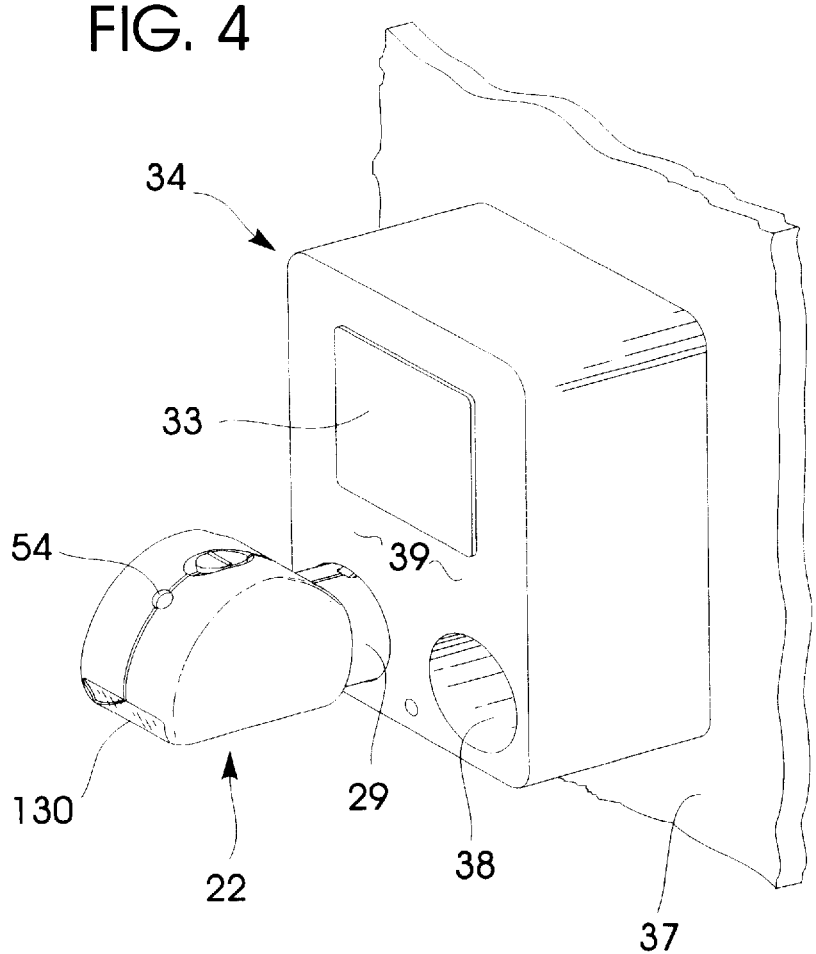
FIG. 4 is a fragmentary perspective view illustrating recharging within a dwelling.

In a vehicular setting the portable module 22 may be plugged into the D.C. cigarette lighter socket. Alternatively, it may be coupled to an A.C. powered recharger 34 (FIG. 2) within, for example, the home or office. For charging purposes the generally tapered shank 29 is simply inserted within appropriate orifices 36, 38 defined at the front 39 of recharger 34 adjacent identification label 33. The recharger 34 is adapted to be plugged into a conventional source of 117–120 volt AC current with its conventional prongs 35 (FIG. 1) mated within an ordinary electrical outlet. As best seen in FIG. 4, the plug elements 35 mechanically suspend the recharger over a suitable wall socket in wall 37 (FIG. 4) for interior mounting. Insertion of the module into any recharge socket enables recharging of the internal module batteries, and the application of power to output jack 54.

Importantly, module 22 provides a flashlight function, and it may be transformed into a map light. The map light mounting assembly 42 to be discussed in detail hereinafter may be secured in a desired orientation within, for example, a vehicle. The key ring assembly must be removed so that module 22 may be inserted within tubular receptor 40 on assembly 42. The multi-purpose mounting assembly 42 is secured within a vehicle by suitable clips to be discussed hereinafter, such that receptor 42 (and the module 22 received therewithin) are aimed appropriately. Whether or not the key holder assembly 24 is mechanically disassociated from module 22, the invention 20 may provide a handy light source. When inserted within receptor 40 it is mechanically secured in a proper orientation.

The rechargeable module 22 includes a somewhat bulbous, main body portion 46 that contains circuitry to be hereinafter described. Body portion 46 is contoured to fit with a complementary docking mechanism to provide power to a plurality of diverse accessories to be discussed hereinafter The docking mechanism 49 comprises a docking housing 50 having an electronic plug 52 that mates to suitable circuitry described later through an electrical socket 54 (FIG. 3E) in the recharge module. (Socket 54 may optionally power a cellular phone directly without insertion of the docking mechanism). An elongated electrical cable 58 leads from the docking unit 50 to a remote, universal coupling 60 that supports a variety of terminal plugs 61–63 of varying dimensions. These plugs are designed to mate with differently sized power input jacks common to a variety of conventional electronic devices.

With primary emphasis now directed to FIGS. 3 and 3A–3E, the casing of the module 22 comprises a pair of cooperating, molded plastic halves 70, 71. In assembly, the complementary body halves 70, 71 are coupled together and separated by seam 72 (FIG. 3C). The larger body portion 46 is generally in the form of a bulbous handle which fits in the palm of the user. The generally cylindrical, reduced diameter shank 29 extends integrally outwardly from body 46 and terminates at the front of the module in a tapered portion 75. The flat, annular surface 79 at the end of taper 75 is concentric with an annular metal plug 81 projecting from the module front. Plug 81 has an internally threaded orifice 84 adapted to be threadably mated to the keychain apparatus 24. As described hereinafter, plug 81 is electrically connected to circuitry within module 22. This plug energizes the module when inserted within a cigarette lighter socket.

Figure 2:
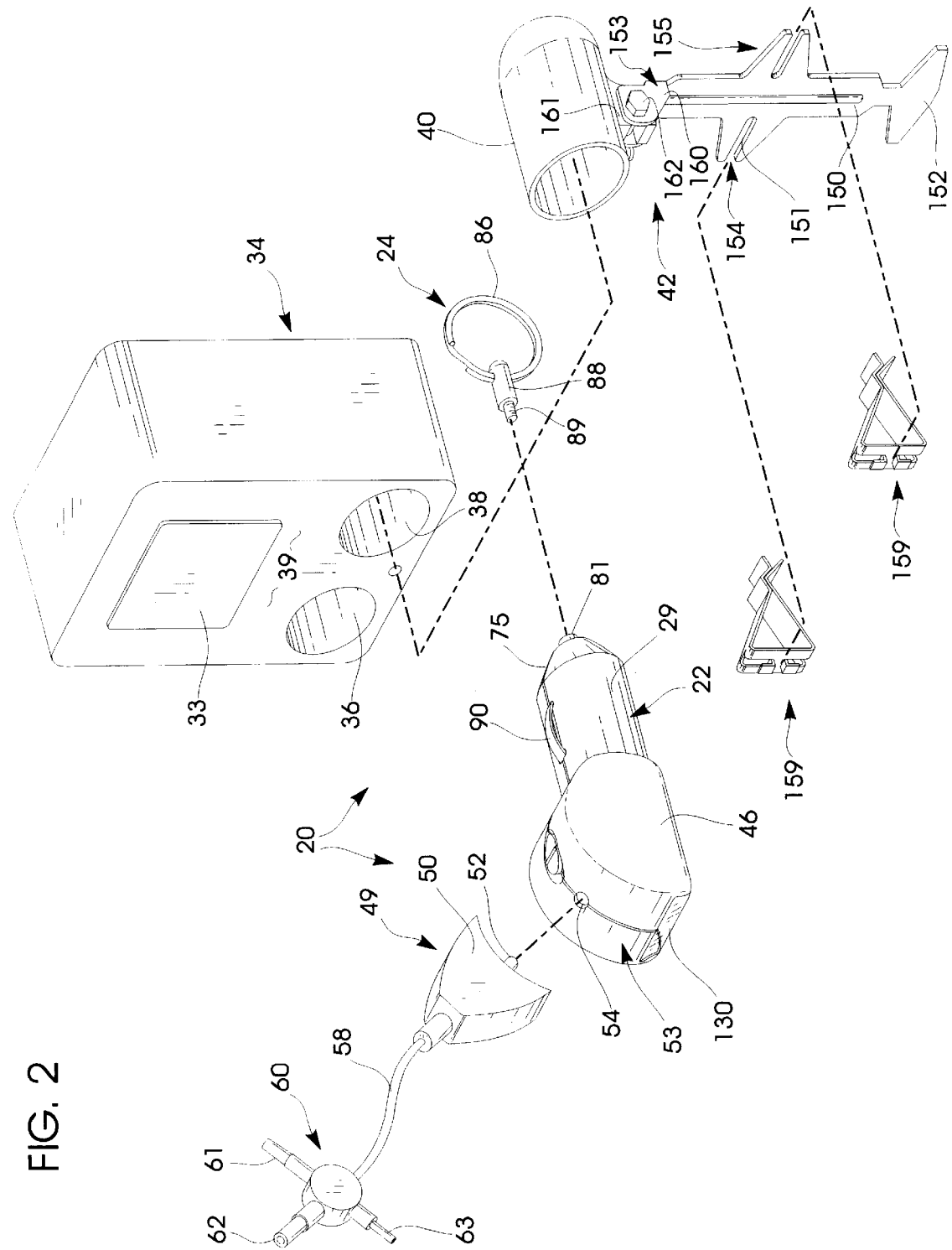
FIG. 2 is a rear exploded rear isometric view of the device similar to FIG. 1.

With additional reference to FIGS. 1 and 2, key chain apparatus 24 includes a conventional metal split ring 86 that penetrates a rigid post 88. A rigid, threaded stub 89 projects outwardly from post 88 for mating with orifice 84 (i.e., FIG. 3) in plug 81 at the front of module 22. The key ring apparatus must be removed prior to recharging module 22. Preferably the diameter of ring 24 is bigger than the diameter of the a cigarette lighter socket to prevent a user from inadvertently inserting the key ring into a cigarette lighter. When mechanically mated to module 22, the key ring post projects forwardly away from the "hot" plug 81.

Shank 29 of the recharger includes an elongated, external metal contact 90 that makes electrical contact with ground when shank 29 is inserted within a recharge socket. The shank 29 is in the form of a conventional automotive cigarette lighter so that the recharge module 22 can be plugged into a conventional cigarette lighter socket. Alternatively it may be received within cigarette lighter "sockets" 36 or 38 provided by recharger 34. The recharge circuit to be described hereinafter is completed by contact with "positive" voltage by the metal plug 81.

The larger diameter module portion 46 also houses an internal recorder to be described electronically later. Audio sounds are inputted and transmitted out of an apertured grill 10 (FIG. 3) that comprises a plastic insert fitted to opposite sides of the recharge unit. The grill 110 includes a plurality of slots 111 for conducting audio sounds. Also mounted on the top of the handle portion 46 is a mechanical "record" button 113 which is spaced-apart from the similarly shaped "play" button 115. These recessed buttons operate the recording unit to be described hereinafter. However the function selector switch 119 must first be activated.

Function selector switch 1 19 controls the lights and audio circuitry of the module. The three position slide switch 119 (FIG. 3C) is aligned within seam 172 and constrained at the bottom of the module. The indicator marking 120 on the switch face is aligned with the "Off" mark on the module bottom (FIG. 3C) when neither function is selected. The switch is moved to the "R" position to start the recorder/playback apparatus, or to the "L" position for activating the internal light. The LED indicators 128 and 129 are activated in response to the recorder/playback circuitry to be described hereinafter. Illumination occurs when bulb 132 (FIGS. 3A, 3B) is activated. A directed beam is outputted through lens 130 at the rear of the module towards an object to be illuminated.

The docking mechanism 49 distributes power for the accessory recharge function. Docking housing 50 has a substantially concave underside 140 (FIG. 1) adapted to flushly mate with the convexly profiled surface area 53 (FIG. 2) of the recharger module rear. When attached to the recharge module the plug 52 penetrates socket 54 in the recharger to make electrical contact. At this time bypass switch 188 should be activated. A variety of regulated voltages may be selected for output from the docking mechanism as described later. A rotary switch 142 (FIG. 4A) on the docking mechanism may be dialed into various contact positions 144 to select a desired Output voltage. Voltage selection relates to the accessory to be remotely powered. The regulated "dial up" voltage appears on the output jacks 61, 62 or 63, one of which will be selected and inserted into a complimentary jack in the device to be recharged.

With primary reference now directed to FIGS. 1 and 2, the map light assembly 42 is primarily used within a vehicle. Assembly 42 preferably comprises a plastic reinforced, elongated stand 150 having a transversely oriented, bottom foot 152 and a pair of intermediate, transversely extending wings 154 and 155. Each of these wings are provided with slots 151 that slidably receive mating clips 159 to be described later. The top 153 of the stand 150 comprises a pair of integral, spaced apart flanges 160 surmounting a mounting lug 161 downwardly projecting from the tubular receptor 40 (FIG. 2). Pivoting is provided by a fastener 162 that is hand tightened with mating wing nut 165 (FIG. 1) projecting from the opposite side. The standard wing nut 165 permits the user to adjust the map light arrangement as desired to project light towards the intended target.

In operation the map light stand 150 must be properly oriented and mounted. The length of the stand may pivot slightly about the points established by slotted wings 154, 155. Rotation or pivoting of the stand is limited by the bottom foot 152. Further, the orientation and disposition of the clips 159 establishes the mounting angle and the overall orientation. By properly placing the clips the light system will be accurately aimed in the intended direction.

Figure 1A:
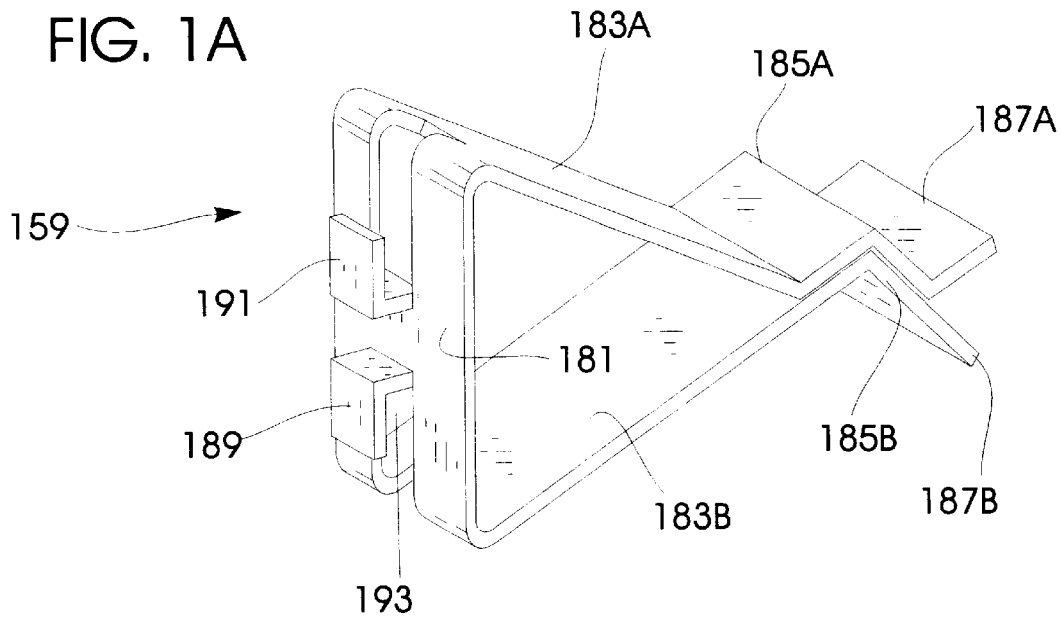
FIG. 1A is an enlarged isometric view of the preferred map light clip.
Figure 1B:
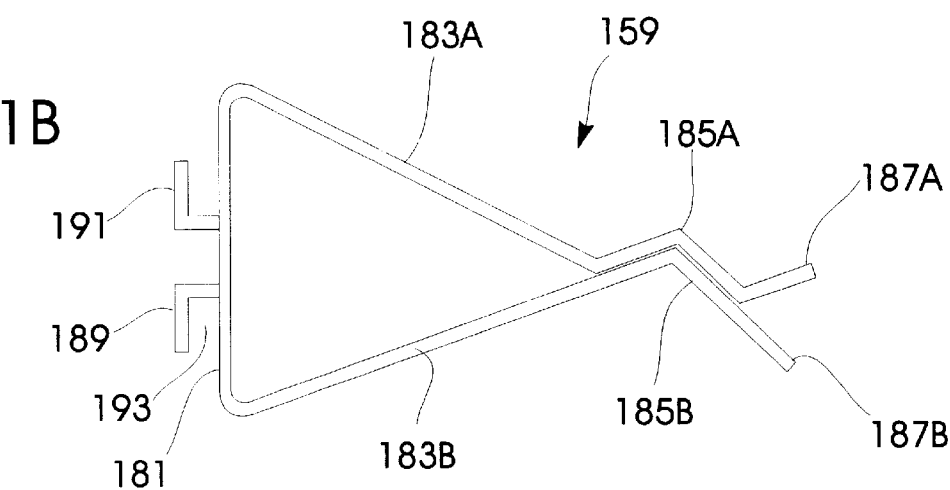
FIG. 1B is a side elevational view of the map light clip of FIG. 1A.
Figure 1C:
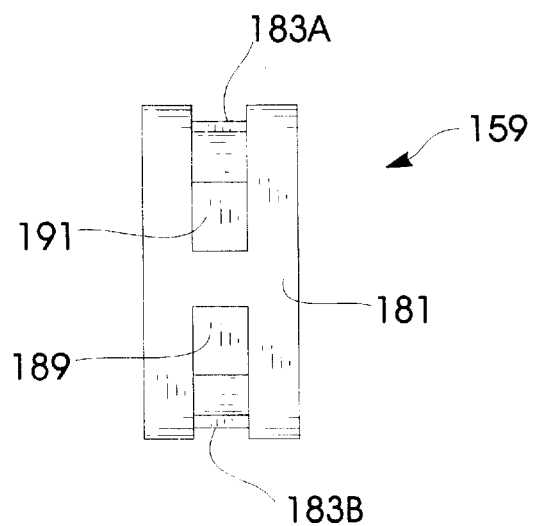
FIG. 1C is an end view of the map light clip of FIGS. 1A, 1B, taken from a position to the left of FIG. 1B.

A preferred mounting clip 159 is best seen in FIGS. 1A–1C. Preferably each clip is molded from resilient plastic. The clip base 181 is integral with a pair of outwardly extending, converging legs 183A and 183B that are yieldably biased together. These legs comprises complimentary zig-zag elbows 185A and 185B respectively that, when the clip is deployed, firmly clamp themselves about a portion of the chosen supporting stricture. For example, they may be secured to a portion of the air conditioning grill or any other convenient dashboard accessory within a vehicle. Terminal angled portions 187A and 187B outwardly diverge from one another to ease mounting, and they can be deflected apart manually when it is desired to reposition or remove the apparatus.

Resilient clips 159 are captivated within the slotted wings 154, 155 of stand 150. Preferably the clips are slidable within the wing slots 151 against yieldable pressure from opposed L-shaped hooks 189, 191. The clearance channels 193 between the hooks and base 181 are occupied by the wings 154, 155 after assembly. Since the resilient hooks are snugly fitted within wing channels 151, they will firmly but yieldably maintain the desired orientation and alignment.

Figure 4A:
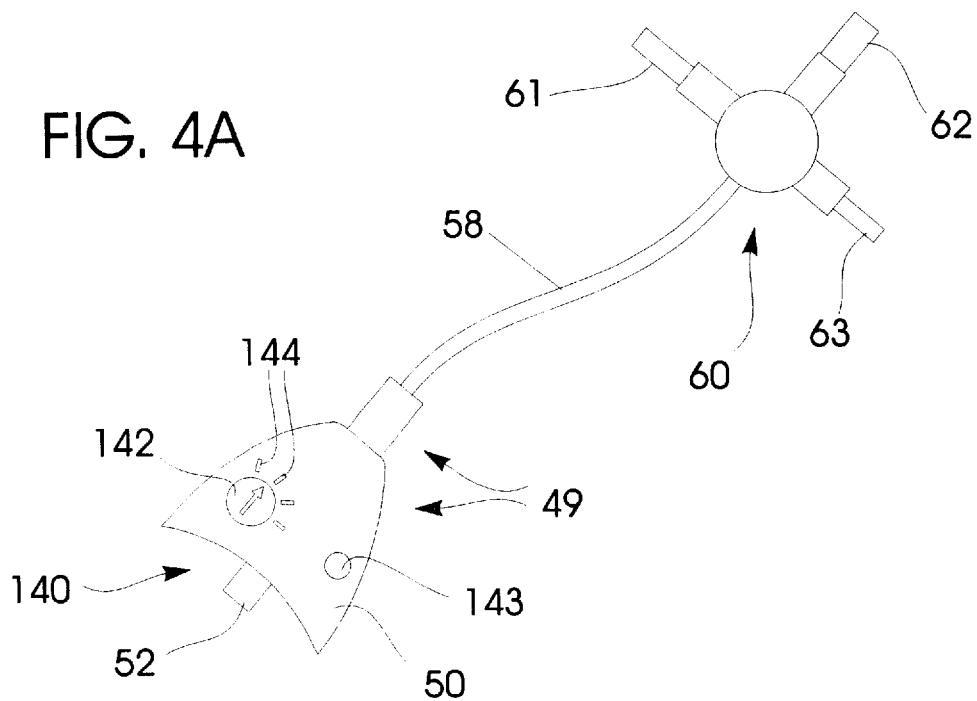
FIG. 4A is an enlarged fragmentary isometric view of the docking mechanism.
Figure 5:
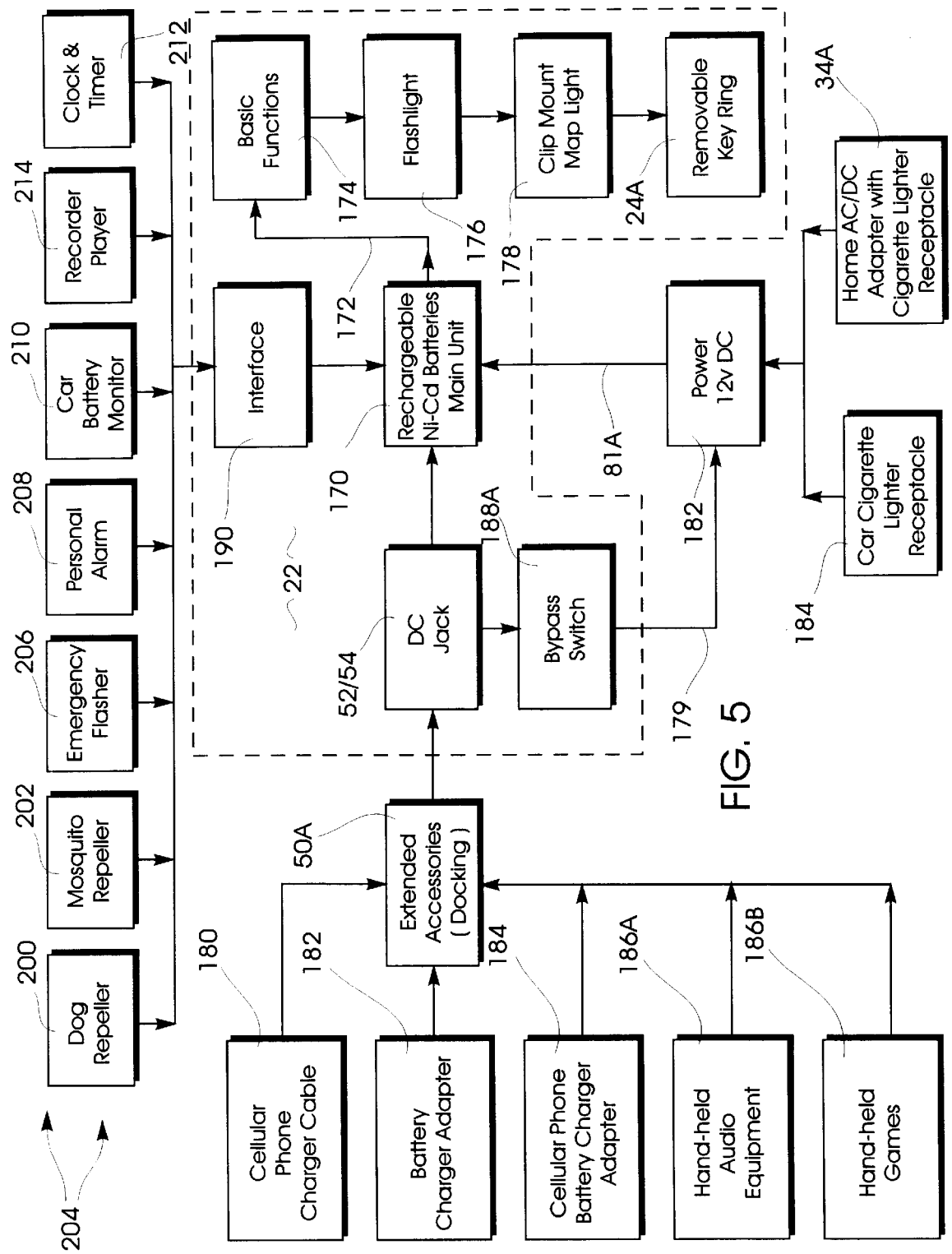
FIG. 5 is a blocked diagram of the electronics of the device.

FIG. 5 depicts the overall electrical operation of the apparatus in generalized block form. The area enclosed in dashed lines represents the module 22. The docking unit 50 is represented electrically by box 50A. It makes electrical contact with voltage recharge source contacted by plug 81 of module 22. Jack 52 (or a cellular phone jack, for example) may be coupled to socket 54 discussed earlier. The docking mechanism 50 enables the selection of a number of extended accessories which may be employed at the leisure of the operator. A number of popular consumer goods, which are often portable, requiring different electrical voltages and varying mechanical connections may be powered by the docking unit. The desired docking unit plug 61–63 must be chosen, (FIG. 2), and the selection switch 142 on the docking mechanism 50 must be switched to the right voltage (i.e., FIG. 4A). A vehicle battery charger adapter 182 may also be interfaced. The cellular phone battery adapter 184, hand-held audio equipment 186A or hand-held games 186B that may similarly be interfaced and powered.

Referring again to FIG. 5, the rechargeable Nicad battery pack 170 outputs approximately 4.8 volts as indicated at line 172 to power functions 174. These include the flashlight function 176 and the map light function 178. The removable key ring apparatus 24A (FIG. 5) mechanically secures keys or the like to the module. While the key ring is schematically drawn as part of the unit, it must be disconnected prior to inserting module shank 29 into any recharger apparatus or the map light receptor 40 previously described. The approximately twelve volt power source 182 (FIG. 5) can be provided by an automotive electrical system 184, or by the reduced DC voltage outputted in ones home from the "cigarette lighter" type power supply 34 (FIGS. 1 & 2).

FIG. 5 also reveals an internal bypass switch, designated in block form by the reference numeral 188A, that allows the direct interconnection of the extended accessory apparatus 50A in FIG. 5 with DC power. Mechanically the bypass switch 188 (FIG. 3E) is mounted on the top of the module. The electrical counterpart, switch 188 in FIG. 6, bypasses the regulator subcircuit 221 for use of the docking mechanism. In other words, the internal regulator subcircuit 221 normally provides the correct Output voltage to a cellular phone plugged into socket 54 instead of the docking unit (i.e., when the module 22 is plugged into a recharge socket). Line 179 designates the connection of the bypass switch to the power source.

Again referencing FIG. 5, module interface 190 interconnects the circuitry to one of the multiple functions 204. High frequency noises can be generated by an oscillator circuit (FIG. 9) that functions as a dog repeller 200. Similar noises can be generated by the same subcircuit to repel mosquitoes as indicated by block 202, or to provide a loud, personal alarm 208. Similarly, an emergency flasher 206 (FIGS. 5, 6), a clock or timer 212, or extended functions 213 (FIG. 6) may be added. The recorder player function has been previously discussed in conjunction with FIGS. 1 and 2. It is referenced generally by the reference numeral 214. The car battery monitor function 210 drawn in block form in FIG. 5 is accomplished by the subcircuit of FIG. 8 to be later described.

Figure 6:
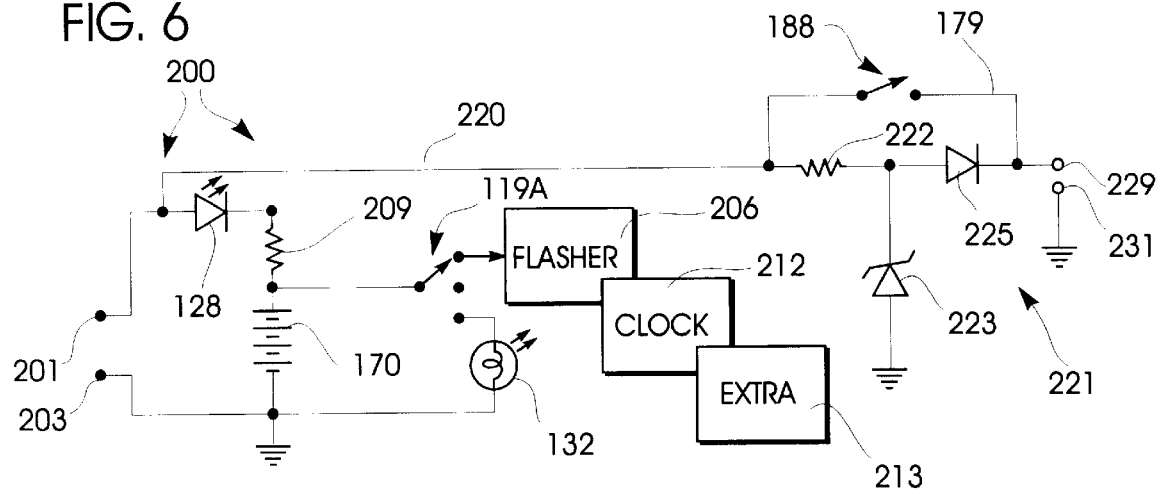
FIG. 6 is an electronic schematic diagram of the power supply.

Tuning now to FIG. 6, the basic charging circuit is generally designated by the reference numeral 200. In FIG. 6 the input node 201 of circuit 200 is established by plug 81 (FIG. 1) that contacts positive voltage with the module plugged in for recharging. The "negative" or ground node 203 is established electrically by contact 90 at the side of the module (FIG. 1). Approximately 12 to 13.8 volts DC is applied across terminals 201, 203 when the module 22 is plugged into a automotive cigarette lighter. At this time the green indicator LED 128 (FIGS. 3, 3A, 6) is switched "on," and current limited by resistor 209 is applied to the battery pack 170 for recharging.

Line 211 (FIG. 6) applies current to the selector switch 119A (which is mechanically designated as 119 in FIG. 3C). With selector switch 119 disposed as illustrated (i.e., in the "R" position), the audio record/playback subcircuit 250 operates. When switched to the "light" position designated by the letter "L," bulb 132 turns on, thereby providing the map light or flashlight functions.

Voltage on line 220 is also delivered to an output regulator subcircuit 221 (FIG. 6) that comprises a current limiting resistor 222 shunted by Zener diode 223 and connected to isolator diode 225. Subcircuit 221 outputs the correct voltage (i.e., 7.5 volts) so that a cellular phone, for example, may be plugged directly into module jack 54 (i.e., across nodes 229, 231). Switch 188 bypasses the regulator subcircuit 221 for docking. When switch 188 is closed, the voltage across nodes 201, 203 applied to line 220 is outputted directly across nodes 229 and 231. These nodes are mechanically established by docking socket 54 discussed previously. Voltage applied to the docking mechanism 50 can thus be distributed "directly" to peripherals, after regulation within the docking mechanism as described hereinafter (i.e., FIG. 10). Bypass switch 188 comprises a two position slide switch mounted on top of module 22 (FIG. 3E) that can be switched between "off" and the bypass position illustrated by the marking "B."

Figure 7:
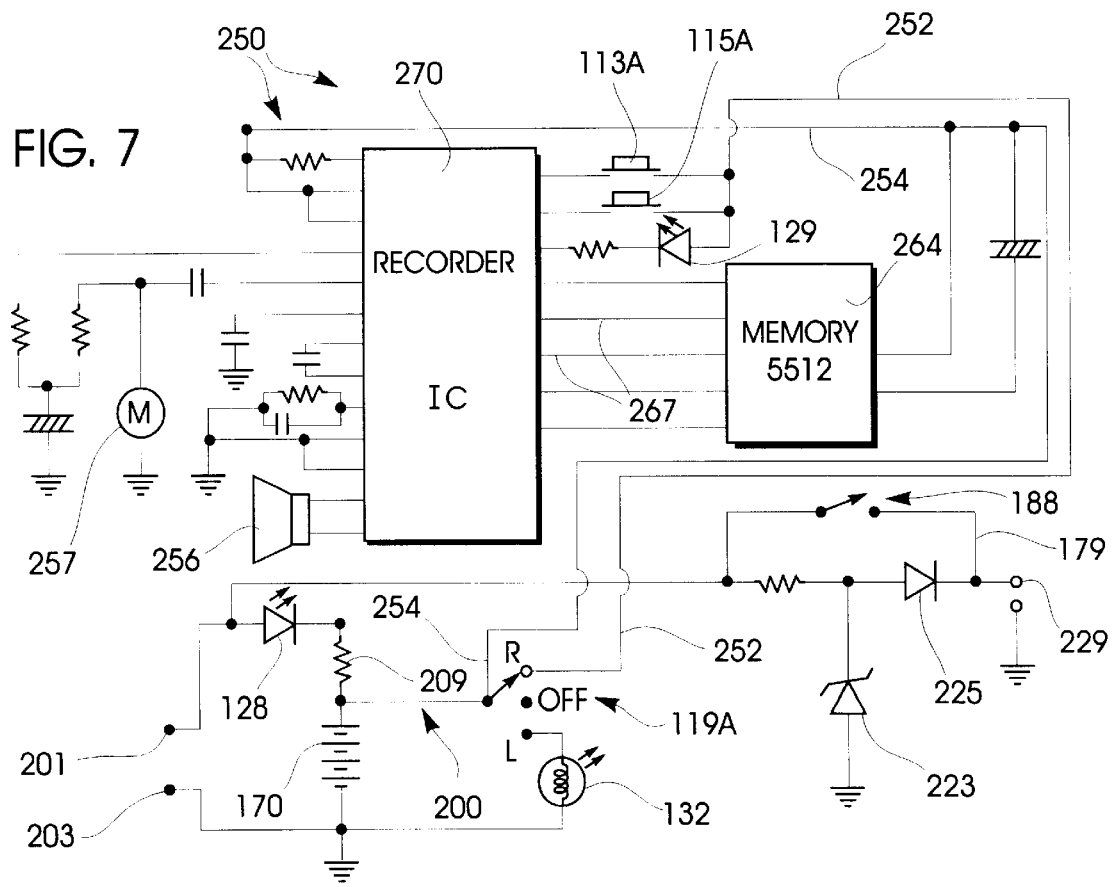
FIG. 7 is an electronic schematic diagram of the record and playback circuitry.

FIG. 7 shows the preferred computerized audio playback and record subcircuit 250. It will be understood that the features are essentially established by well known programming techniques, and that the subcircuit may take on different configurations. Subcircuit 250 is energized by the power supply 200 previously discussed. FIG. 7 shows switch 119A disposed in the record function position. At this time, line 252 is energized by switch 119A. $V_{cc}$ is applied to the subcircuit via line 254. The push buttons 113, 115 shown in FIG. 3 are drawn schematically as buttons 113A and 115A respectively. By pressing button 115A/115 the play function is enabled, and sounds are reproduced by transducer 256. Button switch 113/113A controls the record function.

When "record" is selected, the record IC 270 will digitize audio information incoming from miniature microphone 257. Bus lines 267 deliver digital information from the digital-to-analog converter within IC 270 to the memory chip 264 for storage. The process is reversed in the playback mode—stored digital data in memory 264 is transformed through an analog-to-digital converter within IC and amplified prior to delivery to speaker 256 (FIG. 7). The microphone is physically located within module 22 adjacent an audio port 257A (FIG. 3) defined in grill 110. The red indicator LED 129 (FIGS. 3C, 7) lights tip whenever the record/playback option is selected by switch 119A.

Figure 8:
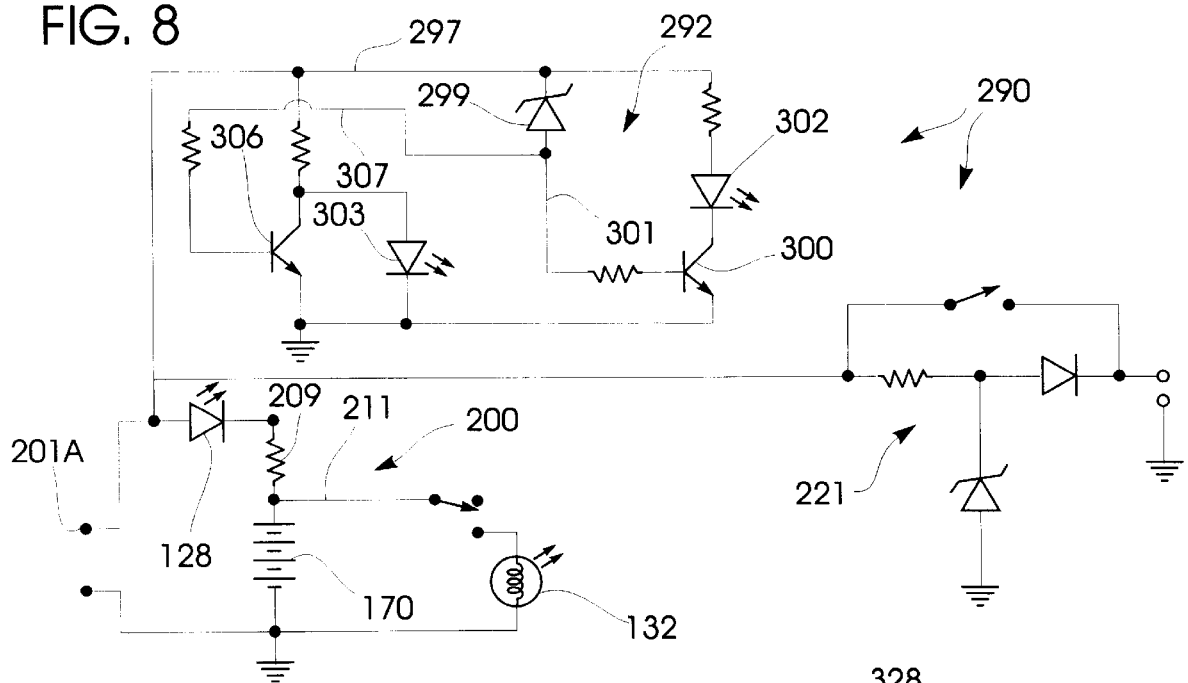
FIG. 8 is an electronic schematic diagram of the preferred vehicle battery monitor circuit.

In FIG. 8 subcircuit 290 establishes the programmable car battery monitor function. Subcircuit 290 includes an auto battery warning circuit 292 which is powered by circuit 200 previously discussed. Previously discussed devices are powered through the shunt regulator circuit 221 (FIG. 6) as mentioned. In this embodiment the incoming voltage node is designated 201A. Subcircuit 292 is powered by voltage on line 297. Depending upon the voltage level, either LED 302 or 303 will provide a warning.

Zener diode 299 (FIG. 7) senses the incoming voltage at node 201A. The voltage level may or may not fire transistors 300, 306. If the voltage on line 297 is high enough, transistor 300 is turned on by diode 299 via line 301, activating LED 302, which indicates that proper voltage has been sensed. However, when voltage on line 297 is too "low," the low voltage indicator LED 303 will be "on." When voltage is appropriate, Zener diode 299 will also turn on transistor 306 via line 307. When transistor 306 conducts, the low voltage indicator LED 303 is "shorted" and thus remains "off."

Figure 9:
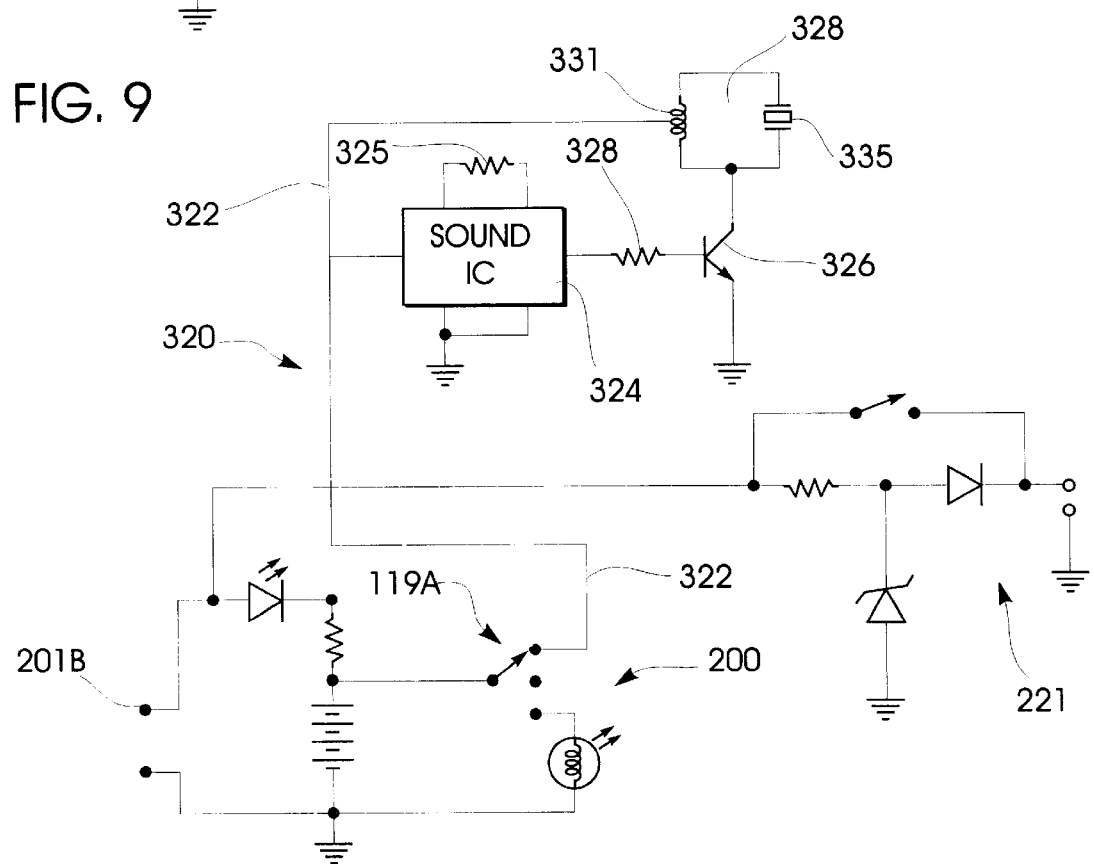
FIG. 9 is an electronic schematic diagram of the transformable circuit that acts as a personal alarm, a mosquito repeller, or dog repeller; and, FIG. 10 is an electronic schematic diagram of the docking mechanism voltage selection circuit.

Turning now to FIG. 9, a transformable sound system subcircuit has been generally designated by the reference numeral 320. Power supply 200, discussed previously, is employed, but in this embodiment the incoming voltage node is designated 201B. With line 322 energized, the sound production IC 324 fires transistor 326 through resistor 328. The value (i.e., in ohms) of feedback resistor 325 may be varied to switch the sound output frequency. A piezoelectric circuit 328 driven by transistor 326 produces amplified sound. Line 322 leads to the center tap of a resonator coil 331. Sound is produced by the parallel-connected, piezoelectric transducer 335. For the personal alarm feature (FIG. 5) the value of resistor 325 (FIG. 9) is approximately 180K ohms. To switch the latter subcircuit to the dog repeller feature (FIG. 5) the resistor value is approximately 51K ohms. To switch to a mosquito repeller function (FIG. 5) the value of resistor 325 is 5.6 megohms.

Figure 10:
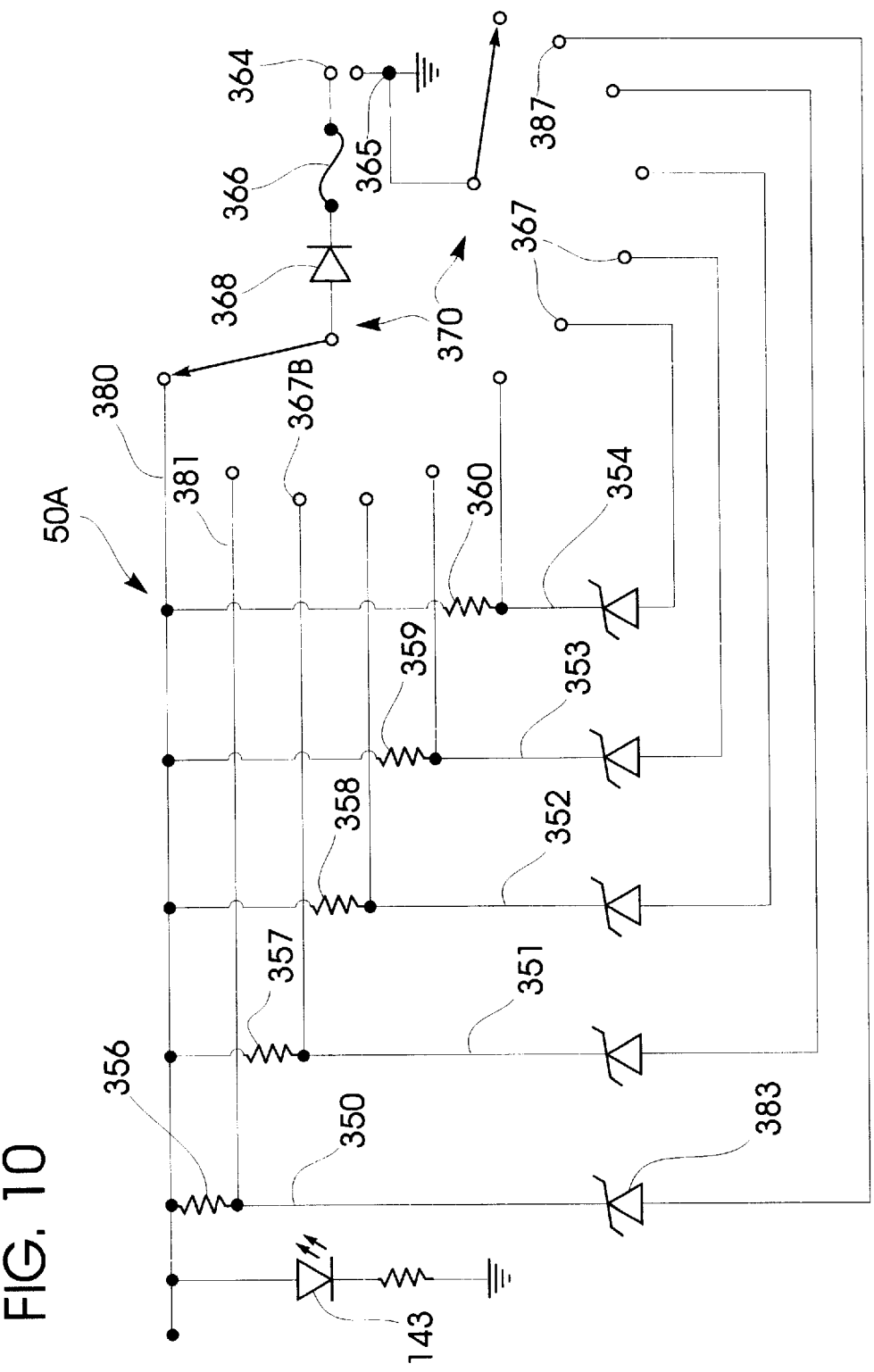

Turning now to FIG. 10, the voltage variable output circuit of the docking mechanism 50 has been generally designated by the circuit reference numeral 50A. When connected to proper voltage as previously discussed (i.e., on node 229 with bypass switch 188 closed), the docking mechanism 50 provides a warning light with LED 143 (FIGS. 4A, 10). Voltage is also applied across lines 350–354 through resistors 356–360. Voltage outputted from docking mechanism is transmitted on wire 58 (FIG. 4A) to the multiple jack 61–63 discussed previously. Each of these jacks designated mechanically in FIGS. 1 and 2 establishes the electrical connection available across nodes 364, 365. Current is limited by a fuse 366 and voltage isolation is provided by diode 368. Voltage selection is determined by the position of the two pole, six position rotary switch generally designated by the reference numeral 370. In operation switch 370 selects one of a plurality of Zener diodes on nodes 367 for shunt-regulation, and it selects one of the resistors 356–360 to series connect to diode 368.

In the illustrated position current inputted to the docking unit when it is connected to the recharge module 22 is directly connected to output 364 through diode 368 and fuse 366. Voltage is developed across ground, so that the "bottom half" of switch 370 is in a neutral position. When other switch positions are selected the voltage is dropped down and regulated. For example, in the next rotary position voltage is dropped by resistor 356 and applied to diode 368 via line 381; concurrently shunt regulator Zener diode 383 is grounded by the bottom contact of switch 370 (i.e., node 387 is grounded) to provide parallel regulation. Similarly, each of the other diode and resistor pairs can be switched into the circuit to provide different output levels. In the preferred embodiment, available D.C. output voltages (i.e., appearing between nodes 364 and 365) are 13.8 (i.e., unregulated by the docking mechanism), 12, 9, 6, and 3.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable, rechargeable, self powered adaptor comprising:
    a module comprising an interior, a handheld portion for grasping by a user, and a reduced diameter shank portion for insertion into a recharger source,
    rechargeable battery means disposed within said interior;
    module circuit means for recharging said battery means in response to said recharger source;
    light means for selectively illuminating an object;
    selector switch means associated with said module circuit means for selectively activating said light means;
    a key ring assembly removably coupled to said module for selectively holding keys; and,
    docking means adapted to be selectively coupled to said module for interfacing with and powering or recharging a plurality of different electronic devices.

2. The adaptor as defined in claim 1 further comprising output regulator means within said adaptor for outputting regulated voltage.

3. The adaptor as defined in claim 2 further comprising means for selectively bypassing said output regulator means.

4. The adaptor as defined in claim 1 wherein said docking means comprises:
    a housing adapted to be coupled to said module to receive a given voltage therefrom;
    voltage selection means within said housing for outputting a plurality of different user selected voltages therefrom; and,
    universal Coupling means comprising a plurality of differently sized plugs for interfacing with a plurality of electronic devices for powering or recharging same in response to said voltage selection means.

5. The adaptor as defined in claim 1 further comprising map light means for mounting said module in a convenient position and aiming it at a selected target.

6. The adaptor as defined in claim 5 wherein said map light means comprises:
   a tubular receptor for receiving and temporarily mounting the module;
   an elongated, resilient stand for supporting the receptor, said stand having a top, a spaced apart lower foot, and a pair of outwardly projecting wings; and,
   mating clip means removably coupled to said wings for securing said stand in a desired orientation.

7. The adaptor as defined in claim 6 wherein said map light means comprises slots defined in said wings, and said mating clip means comprises hook means slidably captivated within said slots.

8. The adaptor as defined in claim 7 wherein said clip means comprises a pair of complimentary, zig-zag legs for clamping about at least a portion of a chosen supporting structure.

9. The adaptor as defined in claim 1 wherein the key ring assembly comprises a split ring for holding keys, said ring having a predetermined diameter, said diameter being greater than the diameter of any recharging source to which the module is plugged so that the module cannot be recharged without removing the key ring assembly.

10. The adaptor as defined in claim 1 further comprising audio record and playback subcircuit means within said module operated by said module circuit means, said audio record and playback subcircuit means comprising:
    means for deriving power from said module circuit means;
    microphone means within said module for detecting audio;
    integrated circuit means for transforming audio between digital and analog states;
    memory means for storing digitized audio;
    speaker means within said module for reproducing analog audio; and,
    means for switching between record or playback functions.

11. The adaptor as defined in claim 1 further comprising vehicle battery monitor subcircuit means for warning when a vehicle battery or electrical system to which the module is connected is too low or too high in voltage.

12. The adaptor as defined in claim 11 wherein said vehicle battery monitor subcircuit means comprises:
    Zener diode means for conducting current when incoming voltage exceeds a predetermined threshold;
    means for indicating proper input voltage;
    transistor means for activating said last mentioned indicator means in response to said Zener diode means;
    means for indicating low input voltage; and,
    second transistor means for disabling said last mentioned indicator means in response to said Zener diode means.

13. The adaptor as defined in claim 1 wherein said adaptor comprises a sound generation alarm system housed therewithin, the sound generation system comprising a subcircuit comprising a sound production integrated circuit, a feedback resistor connected to said integrated circuit, a piezoelectric transducer for producing sound, and wherein said resistor may be switched in value to switch the sound generation system between roles as a personal alarm, a dog repeller, and a mosquito repeller.

14. A portable, rechargeable, battery powered map light comprising:
    a module defining an interior, a handheld portion for grasping by a user, and a reduced diameter shank portion for insertion into a recharger source;
    rechargeable battery means disposed within said interior;
    module circuit means for recharging said battery means in response to said recharger source;
    light means for illuminating an object;
    selector switch means for selectively activating said light means;
    map light means for mounting said module in a convenient position and aiming it at a selected target, said map light means comprising a tubular receptor for receiving said shank portion and temporarily mounting the module, an elongated, resilient stand for supporting the receptor, and clip means removably coupled to said stand for securing said map light means in a desired orientation; and,
    docking means adapted to be selectively coupled to said module for interfacing with and powering or recharging a plurality of different electronic devices, said docking means comprising:
        a housing adapted to be coupled to said module to receive current at a given voltage therefrom;
        voltage selection means within said housing for outputting a plurality of different user selected voltages therefrom; and,
        universal coupling means comprising a plurality of differently sized plugs for interfacing with a plurality of electronic devices for powering or recharging same in response to said voltage selection means.

15. The map light as defined in claim 14 wherein said stand comprises a top, a spaced apart lower foot, and a pair of outwardly projecting wings, and said clip means removably couples to said wings for securing said stand in a desired orientation.

16. The map light as defined in claim 15 wherein said map light means wings comprise slots, said clip means comprises hook means slidably captivated within said slots, and said clip means comprises a pair of complimentary, zig-zag legs for clamping about at least a portion of a chosen supporting structure.

17. The map light as defined in claim 14 further comprising audio record and playback subcircuit means operated by said module circuit means, said audio record and playback subcircuit means comprising:
    means for deriving power from said module circuit means;
    microphone means within said module for detecting audio;
    integrated circuit means for transforming audio between digital and analog states;
    memory means for storing digitized audio;
    speaker means within said module for reproducing analog audio; and,
    means for switching between record or playback functions.

18. The map light as defined in claim 14 further comprising vehicle battery monitor subcircuit means for warning when a vehicle battery or electrical system to which the module is connected is too low or too high in voltage.

19. The map light as defined in claim 18 wherein said vehicle battery monitor subcircuit means comprises:
    Zener diode means for conducting current when incoming voltage exceeds a predetermined threshold;

means for indicating proper input voltage;

transistor means for activating said last mentioned indicator means in response to said Zener diode means;

means for indicating low input voltage; and, second transistor means for disabling said last mentioned indicator means in response to said Zener diode means.

20. The map light as defined in claim 14 wherein said map light comprises a sound generation alarm system housed therewithin, the sound generation system comprising a subcircuit comprising a sound production integrated circuit, a feedback resistor connected to said integrated circuit, a piezoelectric transducer for producing sound, and wherein said resistor may be switched in value to switch tile sound generation system between roles as a personal alarm, a dog repeller, and a mosquito repeller.

21. A portable, rechargeable, key ring and power supply adaptor comprising:

a module comprising an interior, a handheld portion for grasping by a user, and a reduced diameter shank portion for insertion into a recharger source;

rechargeable battery means disposed within said interior;

module circuit means for recharging said battery means in response to said recharger source;

light means for selectively illuminating an object;

selector switch means associated with said module circuit means for selectively activating said light means;

docking means adapted to be selectively coupled to said module for interfacing with and powering or recharging a plurality of different electronic devices; and, a key ring assembly removably coupled to said module for selectively holding keys, said key ring assembly comprising a split ring for holding keys, said ring having a predetermined diameter, said diameter being greater than the diameter of any recharging source into which the module is plugged so that the module cannot be recharged without removing the key ring assembly.

22. The adaptor as defined in claim 21 wherein said docking means comprises:

a housing adapted to be coupled to said module to receive current at a given voltage therefrom;

voltage selection means within said housing for outputting a plurality of different user selected voltages therefrom; and, universal coupling means comprising a plurality of differently sized plugs for interfacing with a plurality of electronic devices for powering or recharging same in response to said voltage selection means.

23. The adaptor as defined in claim 22 further comprising map light means for mounting said module in a convenient position and aiming it at a selected target, said map light means comprising:

a tubular receptor for receiving and temporarily mounting the module;

an elongated, resilient stand for supporting the receptor, said stand having a top, a spaced apart lower foot, and a pair of outwardly projecting wings; and, mating clip means removably coupled to said wings for securing said stand in a desired orientation.

24. The adaptor as defined in claim 23 wherein:

said map light means comprises slots defined in said wings; and, said mating clip means comprises hook means slidably captivated within said slots and a pair of complimentary, zig-zag legs for clamping about at least a portion of a chosen supporting structure.

25. The adaptor as defined in claim 24 further comprising audio record and playback subcircuit means operated by said module circuit means, said audio record and playback subcircuit means comprising:

means for deriving power from said module circuit means;

microphone means within said module for detecting audio;

integrated circuit means for transforming audio between digital and analog states;

memory means for storing digitized audio;

speaker means within said module for reproducing analog audio; and, means for switching between record or playback functions.

26. The adaptor as defined in claim 24 further comprising vehicle battery monitor subcircuit means for warning when a vehicle battery or electrical system to which the module is connected is too low or too high in voltage.

27. The adaptor as defined in claim 26 wherein said vehicle battery monitor subcircuit means comprises:

Zener diode means for conducting current when incoming voltage exceeds a predetermined threshold;

means for indicating proper input voltage;

transistor means for activating said last mentioned indicator means in response to said Zener diode means;

means for indicating low input voltage; and, second transistor means for disabling said last mentioned indicator means in response to said Zener diode means.

28. The adaptor as defined in claim 24 further comprising a transformable sound generation alarm system comprising a subcircuit comprising a sound production integrated circuit, a feedback resistor connected to said integrated circuit, a piezoelectric transducer for producing sound, and wherein said resistor may be switched in value to switch the sound generation system between roles as a personal alarm, a dog repeller, and a mosquito repeller.

* * * * *